United States Patent
Yoda

(10) Patent No.: US 9,626,134 B2
(45) Date of Patent: Apr. 18, 2017

(54) INFORMATION PROCESSING APPARATUS, IMAGE FORMING APPARATUS, INFORMATION PROCESSING SYSTEM, INFORMATION PROCESSING METHOD, AND STORAGE MEDIUM

(71) Applicant: FUJI XEROX CO., LTD., Tokyo (JP)

(72) Inventor: Yoshiyuki Yoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/882,820

(22) Filed: Oct. 14, 2015

(65) Prior Publication Data

US 2016/0299729 A1    Oct. 13, 2016

(30) Foreign Application Priority Data

Apr. 9, 2015    (JP) .................................. 2015-080070

(51) Int. Cl.
  *G06F 3/12*    (2006.01)
(52) U.S. Cl.
  CPC .......... *G06F 3/1236* (2013.01); *G06F 3/1205* (2013.01); *G06F 3/1253* (2013.01); *G06F 3/1292* (2013.01)
(58) Field of Classification Search
  USPC ........................................................ 358/1.15
  See application file for complete search history.

(56) References Cited

U.S. PATENT DOCUMENTS

| | | | | |
|---|---|---|---|---|
| 8,891,106 B1* | 11/2014 | Haapanen | ............. | G06F 3/1204 358/1.14 |
| 2014/0004879 A1* | 1/2014 | Matsushita | ............. | H04W 4/02 455/456.1 |
| 2015/0126115 A1* | 5/2015 | Yun | ...................... | H04L 63/0492 455/41.1 |
| 2015/0378296 A1* | 12/2015 | Kim | .................... | G03G 15/5091 399/80 |
| 2016/0182762 A1* | 6/2016 | Eum | ..................... | H04N 1/4413 358/1.14 |

FOREIGN PATENT DOCUMENTS

| | | |
|---|---|---|
| JP | 2009-146360 A | 7/2009 |
| JP | 2011-109258 A | 6/2011 |
| JP | 2012-191646 A | 10/2012 |

* cited by examiner

*Primary Examiner* — Ngon Nguyen
(74) *Attorney, Agent, or Firm* — Sughrue Mion, PLLC

(57) ABSTRACT

An information processing apparatus includes an emitting unit that emits a marker signal including apparatus identification information of the apparatus to a predetermined region; an acquiring unit that associates terminal identification information for identifying a terminal with the apparatus identification information and acquires the associated information from the terminal; a registering unit that, if the apparatus identification information acquired by the acquiring unit is the apparatus identification information emitted from the emitting unit, registers the acquired terminal identification information as terminal identification information of a terminal in the region; and a transmitting unit that, when a request for searching an information processing apparatus is received from a terminal, transmits the apparatus identification information to the terminal if terminal identification information of the terminal making the request is registered in the registering unit, and does not transmit the apparatus identification information if the terminal identification information is not registered.

10 Claims, 4 Drawing Sheets

INFORMATION PROCESSING APPARATUS, IMAGE FORMING APPARATUS, INFORMATION PROCESSING SYSTEM, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2015-080070 filed Apr. 9, 2015.

BACKGROUND

The present invention relates to an information processing apparatus, an image forming apparatus, an information processing system, an information processing method, and a storage medium.

SUMMARY

According to an aspect of the invention, there is provided an information processing apparatus including an emitting unit that emits a marker signal including apparatus identification information of the information processing apparatus to a predetermined region; an acquiring unit that associates terminal identification information for identifying a terminal with the apparatus identification information and acquires the terminal identification information associated with the apparatus identification information from the terminal; a registering unit that, if the apparatus identification information acquired by the acquiring unit is the apparatus identification information emitted from the emitting unit, registers the terminal identification information acquired in association with the acquired apparatus identification information, as terminal identification information of a terminal existing in the region; and a transmitting unit that, when a request for searching an information processing apparatus is received from a terminal, transmits the apparatus identification information of the image forming apparatus to the terminal if terminal identification information of the terminal, which has made the request, is registered in the registering unit, and does not transmit the apparatus identification information of the information processing apparatus if the terminal identification information of the terminal, which has made the request, is not registered in the registering unit.

BRIEF DESCRIPTION OF THE DRAWINGS

An exemplary embodiment of the present invention will be described in detail based on the following figures, wherein.

DETAILED DESCRIPTION

1. Exemplary Embodiment

1-1. General Configuration of Image Forming System

Figure 1:
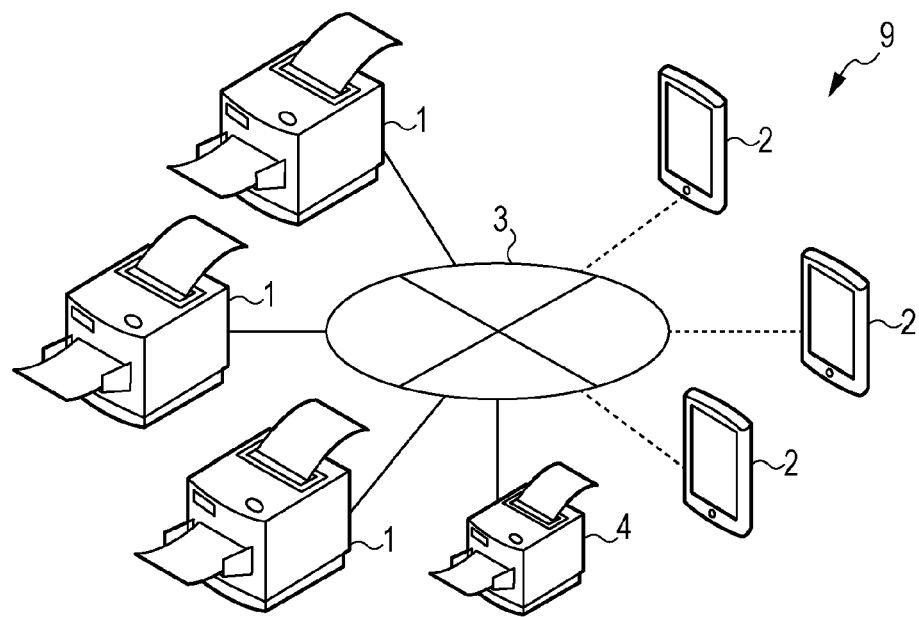
FIG. 1 illustrates a general configuration of an image forming system according to an exemplary embodiment.

FIG. 1 illustrates a general configuration of an image forming system 9 according to an exemplary embodiment. As shown in FIG. 1, the image forming system 9 includes an image forming apparatus 1, a terminal 2, and a communication line 3 that connects the image forming apparatus 1 with the terminal 2.

The image forming apparatus 1 is connected to the communication line 3 in a wired manner. The terminal 2 is connected to the communication line 3 in a wireless manner through a wireless access point. The image forming apparatus 1 and the terminal 2 transmit and receive information through the communication line 3.

The image forming apparatus 1 is an output device that accepts an instruction of the terminal 2 and forms an image in accordance with the instruction. Also, an image forming apparatus 4 not including a characteristic configuration according to the exemplary embodiment of the invention and hence being different from the image forming apparatus 1 may be connected to the communication line 3. The image forming system 9 may include plural image forming apparatuses 1, plural terminals 2, and plural image forming apparatuses 4.

Figure 2:
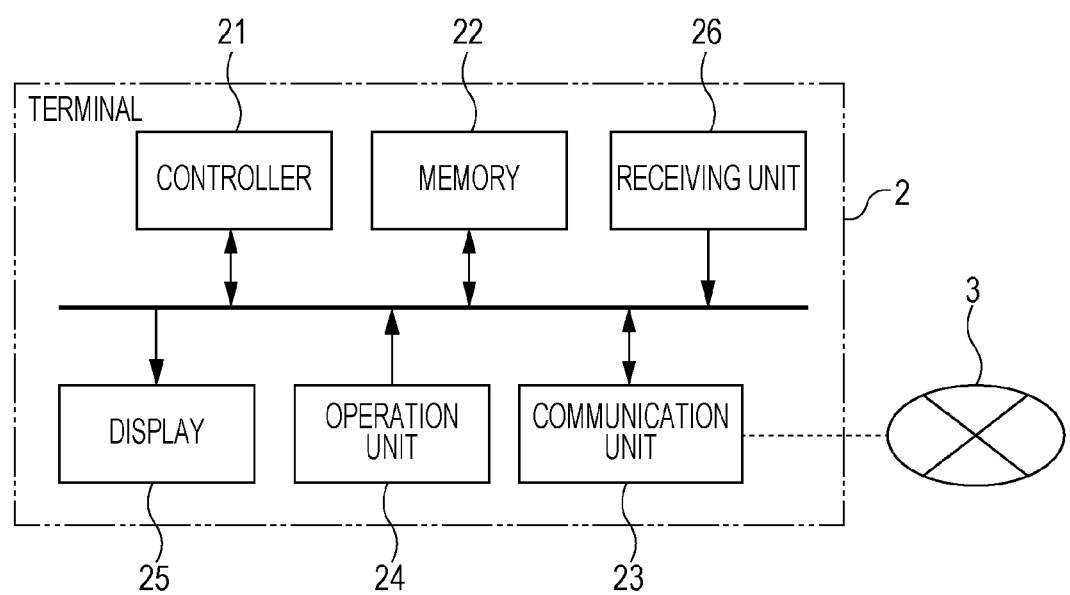
FIG. 2 illustrates a configuration of a terminal according to this exemplary embodiment.

FIG. 2 illustrates a configuration of the terminal 2 according to this exemplary embodiment. A controller 21 includes a central processing unit (CPU), a read only memory (ROM), and a random access memory (RAM). The CPU reads out and executes a computer program (hereinafter, merely referred to as program) stored in the ROM or a memory 22. Thus, the controller 21 controls respective units of the terminal 2.

The memory 22 is a large-capacity memory such as a hard disk drive. The memory 22 stores an application program (referred to as application) that is read in the CPU of the controller 21. A communication unit 23 is a wireless communication circuit that connects the terminal 2 to the communication line 3.

An operation unit 24 includes an operator, such as an operation button or a touch panel, for giving various instructions. The operation unit 24 accepts an operation by a user, and supplies a signal corresponding to the operation content to the controller 21.

A display 25 includes a liquid crystal display. The display 25 displays the result of a diagnosis by the controller 21, information stored in the memory 22, etc. Also, the display 25 may configure a touch panel together with the operation unit 24. A receiving unit 26 is a device that receives a marker signal emitted from the image forming apparatus 1 in a wireless manner.

Figure 3:
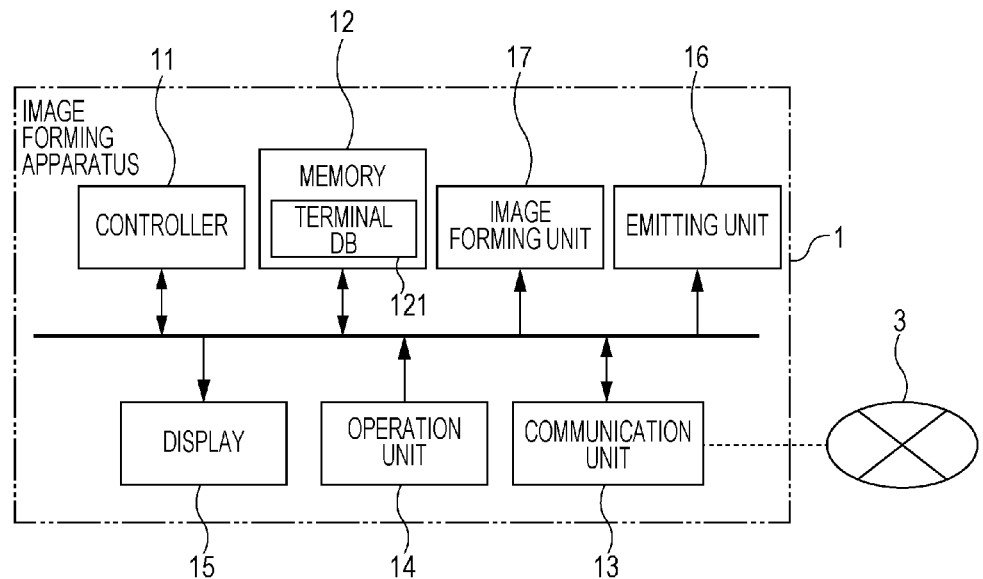
FIG. 3 illustrates a configuration of an image forming apparatus according to this exemplary embodiment.

FIG. 3 illustrates a configuration of the image forming apparatus 1 according to this exemplary embodiment. A controller 11 includes a CPU, a ROM, and a RAM. The CPU reads out and executes a program stored in the ROM or a memory 12. Thus, the controller 11 controls respective units of the image forming apparatus 1.

The memory 12 is a memory such as a solid state drive. The memory 12 stores a program that is read in the CPU of the controller 11. Also, the memory 12 stores a terminal database (hereinafter, in the drawing, "database" is written as "DB") 121 that stores identification information of the terminal 2. The terminal database 121 is described in detail later.

A communication unit 13 is a wired communication circuit that connects the image forming apparatus 1 to the communication line 3. An operation unit 14 includes an operator, such as an operation button or a touch panel, for giving various instructions. The operation unit 14 accepts an operation by a user, and supplies a signal corresponding to the operation content to the controller 11.

A display 15 includes a liquid crystal display. The display 15 displays the result of a diagnosis by the controller 11, information stored in the memory 12, etc. Also, the display 15 may configure a touch panel together with the operation unit 14.

An emitting unit 16 is an example of an emitting unit that emits a marker signal. The emitting unit 16 is, for example, a near field communication device based on the standard of IEEE 802.15. The emitting unit 16 periodically emits a marker signal assigned to the image forming apparatus. This marker signal is previously stored in, for example, the memory 12. The marker signal includes apparatus identification information for identifying the image forming apparatus 1. Also, the distance that the marker signal reaches is determined by the output amount of a radio wave used for emission and the arrangement of a shield substance of the radio wave.

An image forming unit 17 executes processing of fixing a toner to a medium such as paper by an electrophotographic technique and hence forming an image under the control of the controller 11.

1-2. Functional Configuration of Image Forming Apparatus

Figure 4:
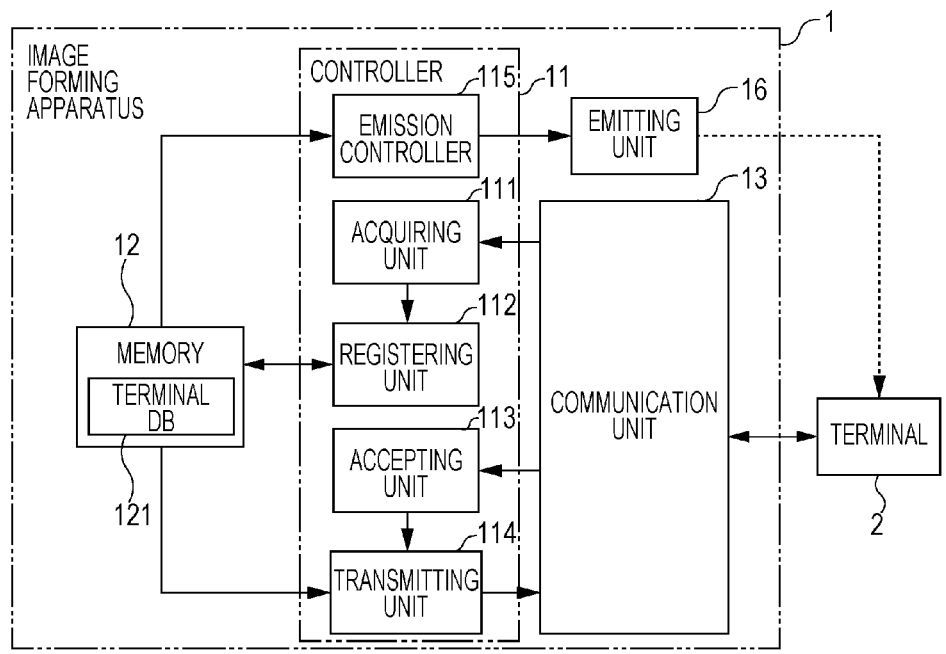
FIG. 4 illustrates a functional configuration of the image forming apparatus of the image forming system.

FIG. 4 illustrates a functional configuration of the image forming apparatus 1 of the image forming system 9. The controller 11 of the image forming apparatus 1 functions as an acquiring unit 111, a registering unit 112, an accepting unit 113, a transmitting unit 114, and an emission controller 115, by executing a program stored in the memory 12. In FIG. 4, the communication line 3 that transfers transmission and reception of information between the image forming apparatus 1 and the terminal 2 is not illustrated.

The emission controller 115 reads out the marker signal assigned to the image forming apparatus 1 from the memory 12, and causes the emitting unit 16 to emit the marker signal. When the marker signal is emitted from the emitting unit 16, the receiving unit 26 of the terminal 2 existing in a predetermined region from the emitting unit 16 receives the marker signal.

When the terminal 2 receives the marker signal, the terminal 2 transmits a response packet to the communication line 3 by multicasting. The response packet includes terminal identification information indicative of the terminal 2 in association with the apparatus identification information included in the received marker signal. The image forming apparatus 1 interprets the response packet received through the communication line 3, and checks the presence of the apparatus identification information corresponding to the image forming apparatus 1. If the image forming apparatus 4 receives the response packet, since the image forming apparatus 4 does not have the function of accepting and interpreting the response packet, the image forming apparatus 4 ignores the response packet.

The acquiring unit 111 acquires the terminal identification information of the terminal 2 included in the response packet received from the terminal 2, and the apparatus identification information received by the terminal 2, in an associated manner.

If the response packet acquired by the acquiring unit 111 includes the marker signal emitted from the emitting unit 16 of the image forming apparatus 1, that is, if the response packet includes the apparatus identification information for identifying the image forming apparatus 1, the registering unit 112 registers the terminal identification information acquired in association with the acquired apparatus identification information, in the terminal database 121 of the memory 12. At this time, the registering unit 112 registers the acquired terminal identification information as the terminal identification information of the terminal 2 existing in the region, to which the emitting unit 16 of the image forming apparatus 1 has emitted the marker signal, that is, the region where the marker signal reaches, in the terminal database 121.

Figure 5A:
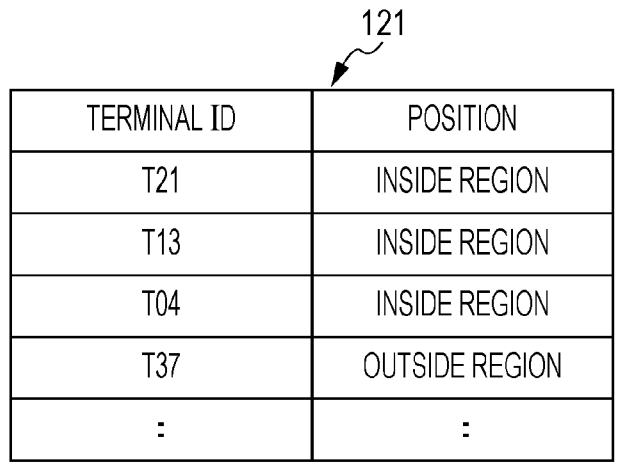
FIGS. 5A to 5C are illustrations for explaining a terminal database.
Figure 5B:
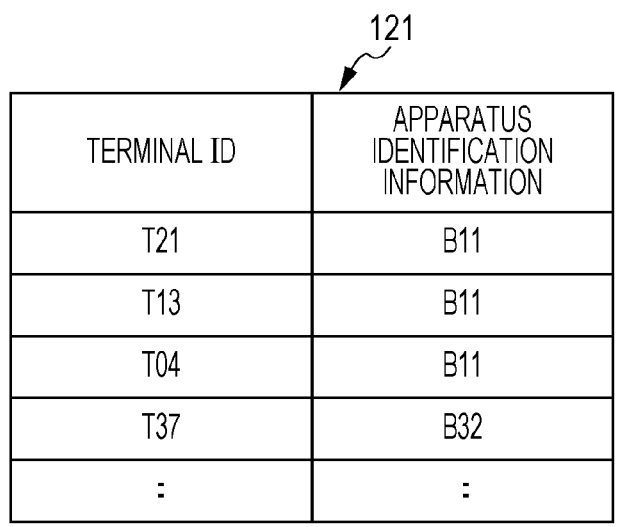
Figure 5C:
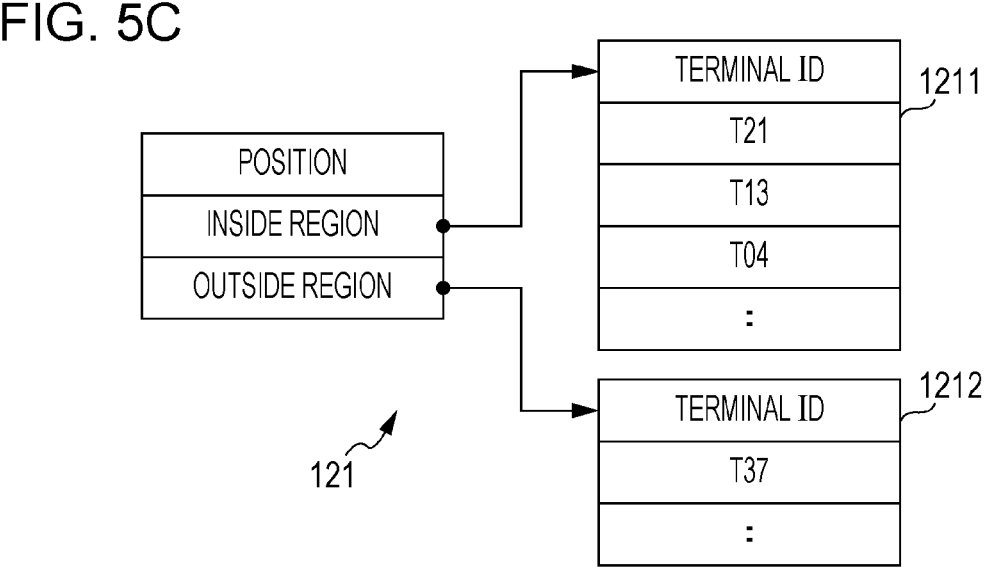

FIGS. 5A to 5C are illustrations for explaining the terminal database 121. The terminal database 121 shown in FIG. 5A includes a table having written therein in an associated manner "terminal ID" indicative of the terminal identification information of the terminal 2, and information indicative of the position of the terminal 2 identified with the terminal ID. The information indicative of the position is information indicative of whether the position of the terminal 2 is inside the region where the marker signal emitted by the image forming apparatus 1 reaches or outside the region. However, without limiting thereto, for example, the terminal database 121 may include a value corresponding to the output amount of the radio wave. In this case, the controller 11 may calculate a rough distance between the terminal 2 and the image forming apparatus 1 from the value corresponding to the output amount, and the rough distance may be used as information indicative of the position. For example, in the terminal database 121 in FIG. 5A, "T21" among terminal IDs is stored as the terminal identification information of the terminal 2 existing inside the region where the marker signal from the emitting unit 16 of the image forming apparatus 1 reaches, that is, "inside region."

If the apparatus identification information included in the response packet acquired by the acquiring unit 111 differs from the apparatus identification information included in the marker signal emitted from the emitting unit 16, the registering unit 112 may register the terminal identification information acquired in association with the acquired response packet as the terminal identification information of the terminal 2 not existing in the region where the marker signal from the emitting unit 16 of the image forming apparatus 1 reaches, in the terminal database 121 of the memory 12. In this case, in the terminal database 121, "outside region" may be written as information indicative of the position of the terminal 2 in association with the terminal identification information of the terminal 2.

As shown in FIG. 5B, in the terminal database 121, the terminal identification information of the terminal 2 acquired by the acquiring unit 111 and the apparatus identification information received by the terminal 2 may be written in an associated manner. In this case, the controller 11 may determine whether the terminal 2 is outside the region or inside the region, by checking whether or not the terminal identification information (the terminal ID) of the terminal 2 written in the terminal database 121 is associated with the apparatus identification information assigned to the image forming apparatus 1 stored in the memory 12.

Also, as shown in FIG. 5C, the terminal database 121 may include an inside-region terminal list 1211 in which the terminal identification information of the terminal 2 existing inside the region is written and an outside-region terminal list 1212 in which the terminal identification information of the terminal 2 not existing in the region is written.

In this case, the registering unit 112 may register the terminal identification information of the terminal 2 supplied in association with the same apparatus identification information as the apparatus identification information included in the marker signal periodically emitted from the emitting unit 16 in the inside-region terminal list 1211, and may register the terminal identification information of the terminal 2 supplied in association with different apparatus identification information in the outside-region terminal list 1212.

The terminal 2 associates the apparatus identification information included in the marker signal with the terminal identification information of the terminal 2 every time when the terminal 2 receives the marker signal, and repetitively transmits the response packet to the communication line 3. After the registering unit 112 registers the terminal identification information of the terminal 2, if the acquiring unit 111 acquires the terminal identification information of the terminal 2 in association with apparatus identification information different from the apparatus identification information included in the marker signal emitted from the emitting unit 16, the registering unit 112 may register the apparatus identification information in the outside-region terminal list 1212. Thus, the registering unit 112 may register the terminal identification information as terminal identification information of a terminal not existing in the region where the marker signal from the emitting unit 16 of the image forming apparatus 1 does not reach. Also, if the terminal 2 determines that the terminal 2 no longer receives the marker signal, the terminal 2 may transmit a notification indicative of the determination to the communication line 3. In this case, the terminal 2 makes the notification by associating the apparatus identification information included in the marker signal which is no longer received, the terminal identification information of the terminal 2, and information indicative of that the marker signal is no longer received. Then, the terminal 2 may transmit this notification to the communication line 3 by multicasting. The acquiring unit 111 may acquire this notification if this notification is transmitted from the terminal 2. If the acquiring unit 111 acquires this notification from the terminal 2, the registering unit 112 may register the notified terminal identification information of the terminal 2 in the outside-region terminal list 1212.

The registering unit 112 may register the terminal identification information of the terminal 2 in the outside-region terminal list 1212, and may delete the terminal identification information from the inside-region terminal list 1211. Accordingly, even if the terminal identification information is deleted from the inside-region terminal list 1211, the terminal identification information is registered in the outside-region terminal list 1212. Accordingly, even if the terminal 2 moves to the outside of the region, the image forming apparatus 1 stores that the terminal 2 is a terminal having the function of receiving the marker signal.

The terminal database 121 shown in FIG. 5C includes the inside-region terminal list 1211 and the outside-region terminal list 1212; however, the terminal database 121 may not include the outside-region terminal list 1212. In this case, after the registering unit 112 registers the terminal identification information of the terminal 2 in the inside-region terminal list 1211, if the apparatus identification information acquired in association with the terminal identification information of the terminal 2 differs from the apparatus identification information of the image forming apparatus 1, the registering unit 112 is only required to delete the terminal identification information from the inside-region terminal list 1211.

The terminal 2 transmits a request (called search request) for searching respective image forming apparatuses 1 in response to an operation by a user. The terminal 2 adds the terminal identification information of the terminal 2 to the search request, and transmits the search request to each of the image forming apparatuses 1. The accepting unit 113 accepts the search request including the terminal identification information of the terminal 2 from the terminal 2.

If the search request accepted by the accepting unit 113 includes the terminal identification information of the terminal 2, the transmitting unit 114 compares the terminal identification information with the terminal identification information registered in the terminal database 121 as the terminal identification information of the terminal 2 existing in the region where the marker signal from the emitting unit 16 of the image forming apparatus 1 reaches. Then, if these compared pieces of the terminal identification information match each other, the transmitting unit 114 transmits identification information for making communication between the terminal 2 and the image forming apparatus 1 through the communication line 3 to the terminal 2.

1-3. Operation of Image Forming Apparatus

Figure 6:
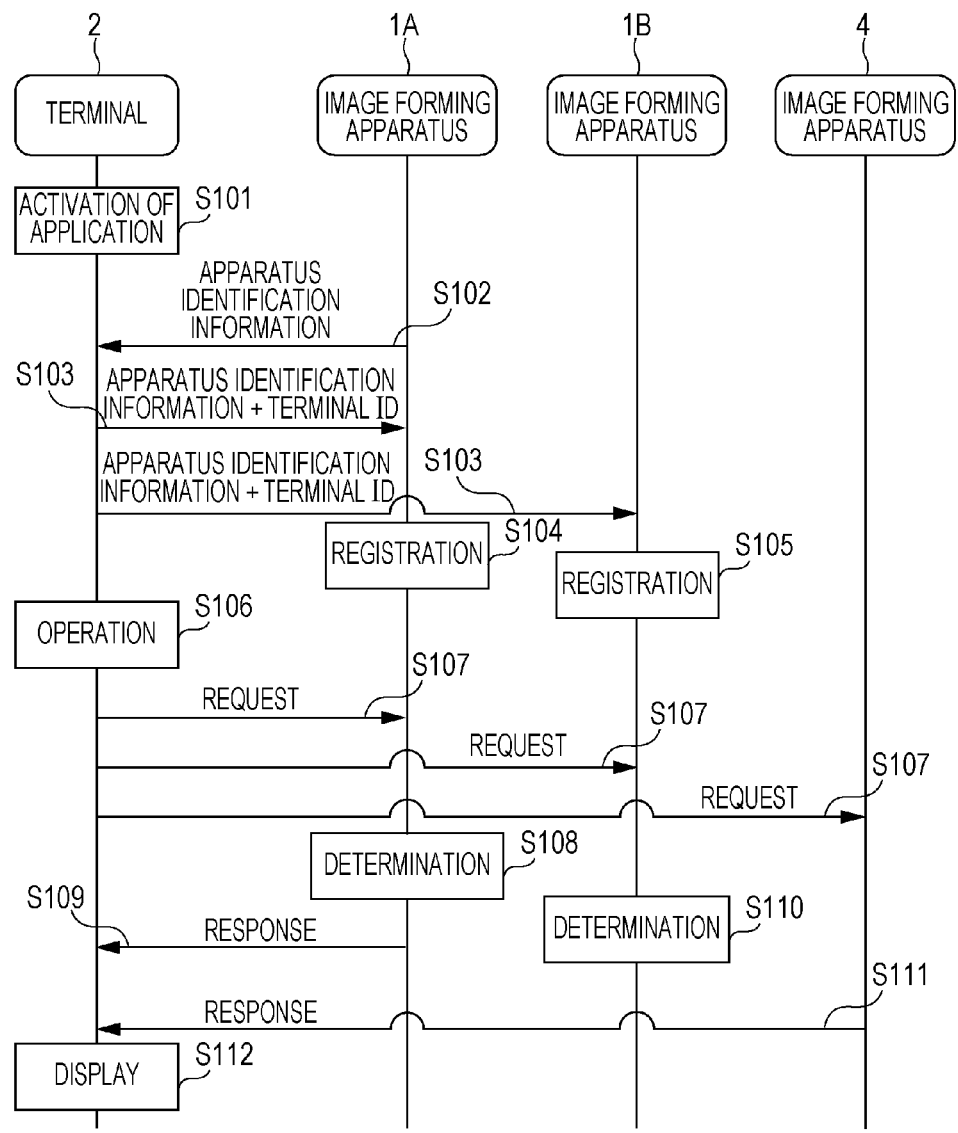
FIG. 6 is a sequence diagram for explaining an operation of the image forming system.

FIG. 6 is a sequence diagram for explaining an operation of the image forming system 9. When the terminal 2 activates the application stored in the memory 22 (step S101), the terminal 2 is brought into a reception standby state for the marker signal emitted from each image forming apparatus 1. When an image forming apparatus 1A being one of the image forming apparatuses 1 emits a marker signal including apparatus identification information of the image forming apparatus 1A, the terminal 2 receives the marker signal (step S102). Then, the terminal 2 transmits and supplies a terminal ID being identification information of the terminal 2 in association with the received apparatus identification information to each of the image forming apparatuses 1 included in the image forming system 9 by multicasting (step S103).

When the image forming apparatus 1A accepts the transmitted apparatus identification information and the terminal ID, the image forming apparatus 1A compares the accepted apparatus identification information with the apparatus identification information of the image forming apparatus 1A. Since these pieces of apparatus identification information match each other, the image forming apparatus 1A registers the accepted terminal ID as terminal identification information of the terminal 2 existing in a region where the marker signal of the image forming apparatus 1A reaches, in a terminal database 121 (step S104).

In contrast, as the result of that an image forming apparatus 1B compares the accepted apparatus identification information with apparatus identification information of the image forming apparatus 1B, these pieces of the apparatus identification information do not match each other. Hence, the image forming apparatus 1B registers the accepted terminal ID as the terminal identification information of the terminal 2 not existing in a region where a marker signal of the image forming apparatus 1B does not reach, in a terminal database 121 (step S105).

When the user of the terminal 2 makes an operation with the terminal 2 to make a search request for identification information of the image forming apparatus 4, the operation unit 24 of the terminal 2 accepts the operation (step S106), transmits the terminal ID (the terminal identification information of the terminal 2) to the image forming apparatus 1 and the image forming apparatus 4 included in the image forming system 9 through the communication line 3, and requests each of the image forming apparatus 1 and the image forming apparatus 4 for apparatus identification information (step S107).

When the image forming apparatus 1A receives the request transmitted in step S107, the image forming apparatus 1A determines whether or not the terminal ID included in the request is registered in the terminal database 121 as "terminal identification information of the terminal 2 existing in the region where the marker signal of the image forming apparatus 1A reaches" (step S108). Since the terminal 2 which has made this request is registered in the terminal database 121 of the image forming apparatus 1A as "terminal identification information of the terminal 2 existing in the region where the marker signal of the image forming apparatus 1A reaches," the image forming apparatus 1A makes a response to the received request by transmitting the apparatus identification information of the image forming apparatus 1A (step S109).

In contrast, since the above-described terminal 2 is not registered in the terminal database 121 of the image forming apparatus 1B as "terminal identification information of the terminal 2 existing in the region where the marker signal of the image forming apparatus 1B reaches," the image forming apparatus 1B does not transmit the apparatus identification information of the image forming apparatus 1B in response to the received request. That is, the image forming apparatus 1B does not make a response to the request (step S110).

Since the image forming apparatus 4 does not have the function of determining whether or not a response is made on the basis of the terminal identification information included in the request, the image forming apparatus 4 may make a response by transmitting identification information of the image forming apparatus 4 in response to the request of the terminal 2 (step S111).

When the terminal 2 acquires the response to the request, the terminal 2 displays the apparatus identification information of the image forming apparatus 1 or the image forming apparatus 4 of the response on the display 25 (step S112). The user may check this display, and make an operation for selecting the image forming apparatus 1 or the image forming apparatus 4 to be used.

With the above-described operation, the image forming apparatus 1 which has emitted the marker signal makes a response only if the terminal 2 operated by the user is inside the region where the marker signal reaches. As the result, for the image forming apparatus 1, the user checks only the apparatus identification information of the image forming apparatus 1 existing near the terminal 2. Therefore, for example, a situation, in which the image forming apparatus 1 existing at a far position such as when the image forming apparatus 1 is arranged in a different building is selected although the image forming apparatus 1 is connected to the communication line 3, and a medium with an image formed is output to the image forming apparatus 1, may be avoided.

2. Modification

While the description given above is for the exemplary embodiment, the content of this exemplary embodiment may be modified as follows. Also, the following modifications may be combined.

2-1. First Modification

In the above-described exemplary embodiment, the apparatus identification information of the image forming apparatus 1 is not specifically described. The apparatus identification information of the image forming apparatus 1 may be information for uniquely identifying the image forming apparatus 1, such as an Internet protocol (IP) address, a media access control (MAC) address, or a uniform resource identifier (URI). That is, the apparatus identification information of the image forming apparatus 1 may be information used for connection of the terminal 2 with the image forming apparatus 1 through the communication line 3, or information used for identification by the user. For example, the apparatus identification information of the image forming apparatus 1 may be the name of the image forming apparatus 1. Since the apparatus identification information of the image forming apparatus 1 is only required to have information for identifying the image forming apparatus 1, plural pieces of information may be present for a single image forming apparatus 1.

Also, if the terminal identification information of the terminal 2 accepted by the accepting unit 113 matches the identification information registered in the terminal database 121 as the terminal identification information of the terminal 2 existing in the region where the marker signal from the emitting unit 16 of the image forming apparatus 1 reaches, the transmitting unit 114 may transmit the name of the image forming apparatus 1 by adding information indicative of that the identification information of the terminal 2 is included in the image forming apparatus 1 to the name of the image forming apparatus 1. That is, the apparatus identification information of the image forming apparatus 1 to be transmitted to the terminal 2 by the transmitting unit 114 may be the name including the information indicative of that the terminal identification information of the terminal 2 being a transmission target is registered in the image forming apparatus 1.

For example, the image forming apparatus 1A assigned with a name "P1A" as the apparatus identification information of the image forming apparatus 1A adds a character string of "near" to the name, as information indicative of that the terminal identification information of the terminal 2 is registered in the image forming apparatus 1A. Hence, the image forming apparatus 1A transmits the name "P1A (near)" as the apparatus identification information of the image forming apparatus 1A to the terminal 2.

In contrast, since the image forming apparatus 4 does not have the emitting function of the above-described marker signal or the registering function of the acquired terminal ID, for example, if a name of "P4" is assigned as the apparatus identification information of the image forming apparatus 4, the image forming apparatus 4 only transmits the name of "P4" as a response. If these names are displayed on the terminal 2, the user of the terminal 2 checks the information (in the above-described example, the character string of "(near)") included in the displayed name. Hence, the image forming apparatus may determine whether or not the terminal 2 being used by the user is registered or not. It may be found that whether or not the image forming apparatus of the displayed name is the image forming apparatus 1 existing within the range where the terminal 2 is able to receive the marker signal.

2-2. Second Modification

The image forming apparatus 1 shown in FIG. 1 includes the image forming unit 17. However, the image forming apparatus 1 may include an interface that sends an instruction for image formation to, for example, the other image forming apparatus associated with the image forming apparatus 1 by one-to-one correspondence. Also, in this case, the image forming apparatus 1 may be an information processing apparatus not including the image forming unit 17.

This information processing apparatus includes the emitting unit 16, the controller 11, the memory 12, and the communication unit 13. The controller 11 executes the program stored in the memory 12, and hence functions as the above-described acquiring unit 111, registering unit 112, accepting unit 113, transmitting unit 114, and emission controller 115. If a request is made from the terminal 2, to which apparatus identification information of the information processing apparatus has been transmitted by the transmitting unit 114, the information processing apparatus may instruct the image forming apparatus to form an image through the above-described interface. In this case, the image forming apparatus that receives the instruction from the information processing apparatus is only required to correspond to the position of the emitting unit 16 of the information processing apparatus.

A portion of the image forming system 9 without the above-described image forming apparatus is interpreted as an information processing system including plural information processing apparatuses and a terminal that receives a marker signal including apparatus identification information emitted from at least one of the information processing apparatus, associates the apparatus identification information with terminal identification information of the terminal, and supplies the associated information to each of the plural information processing apparatuses.

2-3. Third Modification

The image forming system 9 includes the image forming apparatus 1 and the image forming apparatus 4. However, the image forming system 9 may not include the image forming apparatus 4. In this case, only terminal identification information of a terminal 2 existing in the region where the marker signal of the image forming apparatus 1 reaches is registered in the terminal database 121, and terminal identification information of a terminal 2 not existing in the region where the marker signal of the image forming apparatus 1 does not reach may not be registered. With this configuration, since the image forming system 9 includes only the image forming apparatus 1 having the function of registering the terminal identification information of the terminal 2, if terminal identification of a certain terminal 2 is not registered in the terminal database 121 as terminal identification information of a terminal 2 existing in the region where the marker signal of the image forming apparatus 1 reaches, it is determined that the terminal identification information of the terminal 2 does not exist in the region where the marker signal of the image forming apparatus 1 reaches.

2-4. Fourth Modification

The program executed by the controller 11 of the image forming apparatus 1 may be provided in a state of being stored in a computer-readable storage medium, for example, a magnetic storage medium, such as a magnetic tape or a magnetic disk; an optical storage medium such as an optical disc; a magneto-optical storage medium; or a semiconductor memory. Also, the program may be downloaded through, for example, the Internet. Any one of various devices other than the CPU may be applied to the controller exemplified by the above-described controller 11. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory storing program instructions;
at least one processor configured to execute the program instructions that when executed form:
an emitting unit that emits a marker signal including apparatus identification information of the information processing apparatus to a predetermined region;
an acquiring unit that associates terminal identification information for identifying a terminal with the apparatus identification information and acquires the terminal identification information associated with the apparatus identification information from the terminal;
a registering unit that, if the apparatus identification information acquired by the acquiring unit matches the apparatus identification information emitted from the emitting unit, registers the terminal identification information acquired in association with the acquired apparatus identification information, as terminal identification information of a terminal existing in the region; and
a transmitting unit that, in response to receiving a request from a terminal for searching for an information processing apparatus, transmits a response to the request that includes the apparatus identification information of the image forming apparatus if terminal identification information of the terminal that made the request, is registered in the registering unit, and does not transmit the response to the request if the terminal identification information of the terminal that made the request, is not registered in the registering unit.

2. The information processing apparatus according to claim 1,
wherein, when the apparatus identification information acquired by the acquiring unit differs from the apparatus identification information included in the marker signal emitted from the emitting unit,
the registering unit registers the terminal identification information acquired in association with the apparatus identification information as terminal identification information of a terminal not existing in the region, and
the transmitting unit does not transmit the apparatus identification information of the information processing apparatus to the terminal.

3. The information processing apparatus according to claim 1, wherein the apparatus identification information of the information processing apparatus transmitted from the transmitting unit includes information indicative of that the terminal identification information of the terminal being a transmission target is registered in the information processing apparatus.

4. The information processing apparatus according to claim 1,
wherein the acquiring unit repetitively acquires terminal identification information from a terminal, and
wherein, after the registering unit registers the terminal identification information, if apparatus identification information acquired in association with the terminal identification information differs from the apparatus identification information emitted from the emitting unit, the registering unit deletes the terminal identification information.

5. The information processing apparatus according to claim 1,
wherein the acquiring unit repetitively acquires terminal identification information from a terminal in association with the apparatus identification information received by the terminal, and if it is determined that the terminal no longer receives the apparatus identification information, the acquiring unit acquires a notification indicative from the determination from the terminal, and
wherein the registering unit deletes the terminal identification information if the registering unit acquires the notification after the registering unit registers the terminal identification information.

6. The information processing apparatus according to claim 1,
wherein the acquiring unit repetitively acquires terminal identification information from a terminal, and
wherein, after the registering unit registers the terminal identification information, if apparatus identification information acquired in association with the terminal identification information differs from the apparatus identification information emitted from the emitting unit, the registering unit registers the terminal identification information as terminal identification information of a terminal not existing in the region.

7. An image forming apparatus comprising:
the information processing apparatus according to claim 1; and
an image forming unit that forms an image in response to an instruction of the information processing apparatus,
wherein, if image formation is requested from a terminal, to which the apparatus identification information of the information processing apparatus has been transmitted, the information processing apparatus instructs the image forming unit to form the image.

8. An information processing system comprising:
a plurality of information processing apparatuses each being the information processing apparatus according to claim 1; and
a terminal that receives a marker signal including apparatus identification information of at least one of information processing apparatuses emitted from the at least one information processing apparatus, associates the apparatus identification information with terminal identification information of the terminal, and transmits a request for searching the information processing apparatus to the plurality of information processing apparatuses.

9. A non-transitory computer readable medium storing a program causing a computer to execute a process for information processing, the process comprising:
emitting a marker signal including apparatus identification information of an information processing apparatus to a predetermined region;
associating terminal identification information for identifying a terminal with the apparatus identification information and acquiring the terminal identification information associated with the apparatus identification information from the terminal;
if the acquired apparatus identification information matches the emitted apparatus identification information, registering the terminal identification information acquired in association with the acquired apparatus identification information, as terminal identification information of a terminal existing in the region; and
in response to receiving a request from a terminal for searching for an information processing apparatus, transmitting a response to the request that includes the apparatus identification information of the image forming apparatus if terminal identification information of the terminal that made the request, is registered, and not transmitting the response to the request if the terminal identification information of the terminal that made the request, is not registered.

10. An information processing method executed by at least one processor, the method comprising:
emitting a marker signal including apparatus identification information of an information processing apparatus to a predetermined region;
associating terminal identification information for identifying a terminal with the apparatus identification information and acquiring the terminal identification information associated with the apparatus identification information from the terminal;
if the acquired apparatus identification information matches the emitted apparatus identification information, registering the terminal identification information acquired in association with the acquired apparatus identification information, as terminal identification information of a terminal existing in the region; and
in response to a request from a terminal for searching for an information processing apparatus, transmitting a response to the request that includes the apparatus identification information of the image forming apparatus if terminal identification information of the terminal that made the request, is registered, and not transmitting the response to the request if the terminal identification information of the terminal that made the request, is not registered.

* * * * *